(12) United States Patent
Selle

(10) Patent No.: US 7,524,129 B2
(45) Date of Patent: Apr. 28, 2009

(54) FASTENER AND PROCESS FOR USING SAME

(75) Inventor: Stephen Selle, Mentor, OH (US)

(73) Assignee: Stafast Products, Inc., Painesville, OH (US)

( * ) Notice: Subject to any disclaimer, the term of this patent is extended or adjusted under 35 U.S.C. 154(b) by 231 days.

(21) Appl. No.: 11/444,729

(22) Filed: Jun. 1, 2006

(65) Prior Publication Data
US 2007/0280804 A1    Dec. 6, 2007

(51) Int. Cl.
*F16B 21/18*    (2006.01)

(52) U.S. Cl. .......................... 403/13; 411/173; 411/353; 411/520; 411/970

(58) Field of Classification Search ............... 411/107, 411/173, 352, 353, 516, 520, 970, 398; 403/13, 403/14
See application file for complete search history.

(56) References Cited

U.S. PATENT DOCUMENTS

| | | | | |
|---|---|---|---|---|
| 1,881,836 | A * | 10/1932 | Mitchell .................... 411/173 |
| 2,208,779 | A * | 7/1940 | Tinnerman ................... 411/61 |
| 2,267,379 | A * | 12/1941 | Tinnerman ............... 52/718.03 |
| 2,685,721 | A * | 8/1954 | Eves .......................... 411/548 |
| 2,936,668 | A * | 5/1960 | Meyer ........................ 411/520 |
| 3,004,784 | A * | 10/1961 | Selby .......................... 403/19 |
| 3,037,596 | A * | 6/1962 | Fordyce ....................... 52/511 |
| 3,146,656 | A * | 9/1964 | Richards ................. 83/699.31 |
| 3,234,612 | A * | 2/1966 | Raymond ................... 411/352 |
| 3,403,218 | A * | 9/1968 | Norden ......................... 174/53 |
| 4,580,322 | A * | 4/1986 | Wright et al. ................. 24/662 |
| 4,595,325 | A * | 6/1986 | Moran et al. ................ 411/173 |
| 4,860,513 | A * | 8/1989 | Whitman ...................... 52/410 |
| 5,152,582 | A | 10/1992 | Magnuson |
| 5,388,940 | A * | 2/1995 | Herren ....................... 411/107 |
| 5,993,320 | A | 11/1999 | Selle |
| 6,095,738 | A | 8/2000 | Selle |
| 6,174,117 | B1 * | 1/2001 | Kawatani et al. ............ 411/107 |
| 6,185,870 | B1 | 2/2001 | Mettler |
| 6,640,968 | B2 | 11/2003 | Selle |
| 2003/0049097 | A1 | 3/2003 | Selle |
| 2005/0232724 | A1 | 10/2005 | Selle |

* cited by examiner

Primary Examiner—Flemming Saether
(74) Attorney, Agent, or Firm—Woodling, Krost and Rust

(57) ABSTRACT

A connector for securing first and second substrates together, comprising: an outer fastener and an inner fastener is disclosed and claimed. The outer fastener comprises a dowel shaped stud. The inner fastener comprises a flange and a pair of clips. The pair of clips includes a first portion and a second portion. The flange is lanced and includes a punched out portion. The stud interengages the flange and the second portion of the pair of clips urges the clips away from each other and away from the stud. The outer fastener is pressed into the first substrate and the second portion of the clips is pressed into the second substrate. The second portion of the clips include a turned back portion and the turned back portion of the clip grip the second substrate preventing removal of the inner fastener from the second substrate. The connector is tolerant of the misalignment of the inner and outer fasteners and the bores in which the fasteners reside.

7 Claims, 13 Drawing Sheets

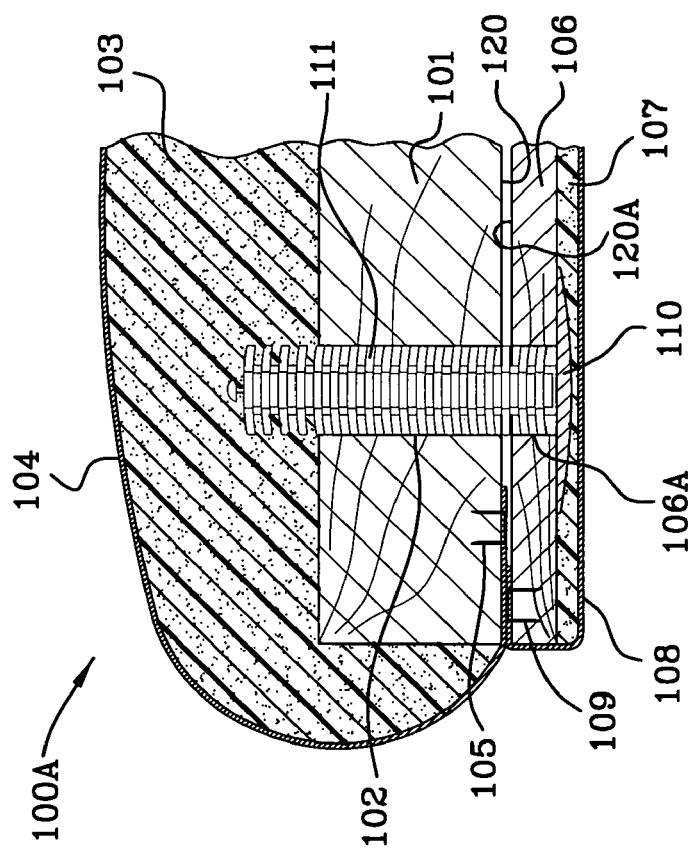
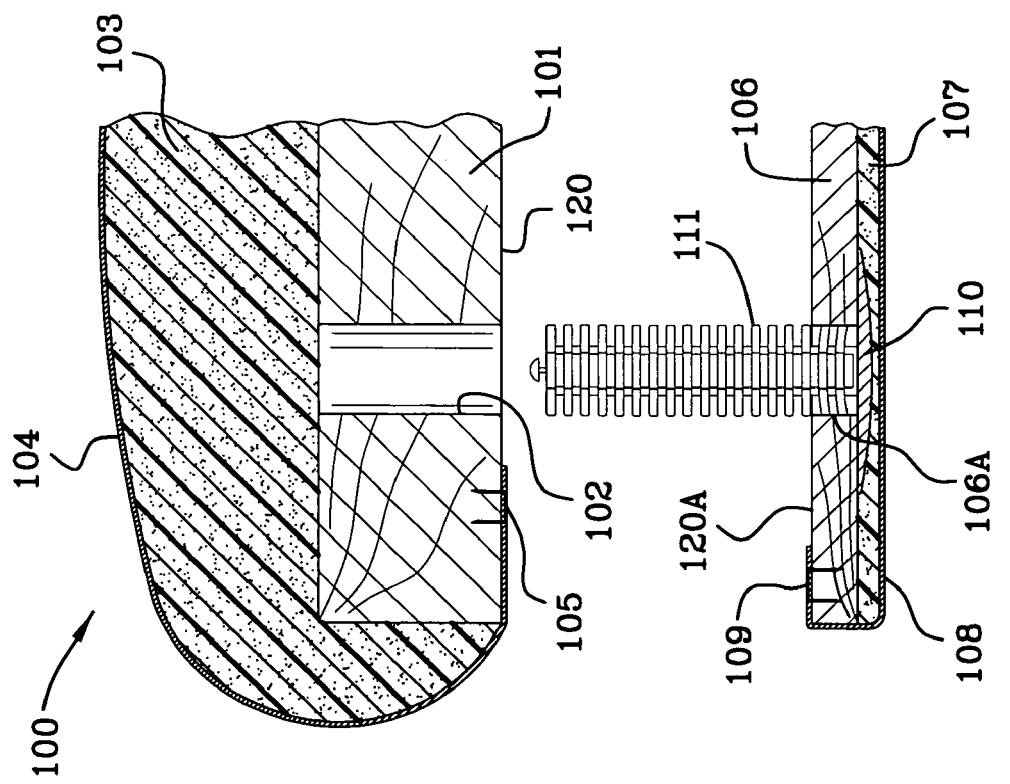
FIG. 1A (Prior Art)
FIG. 1 (Prior Art)

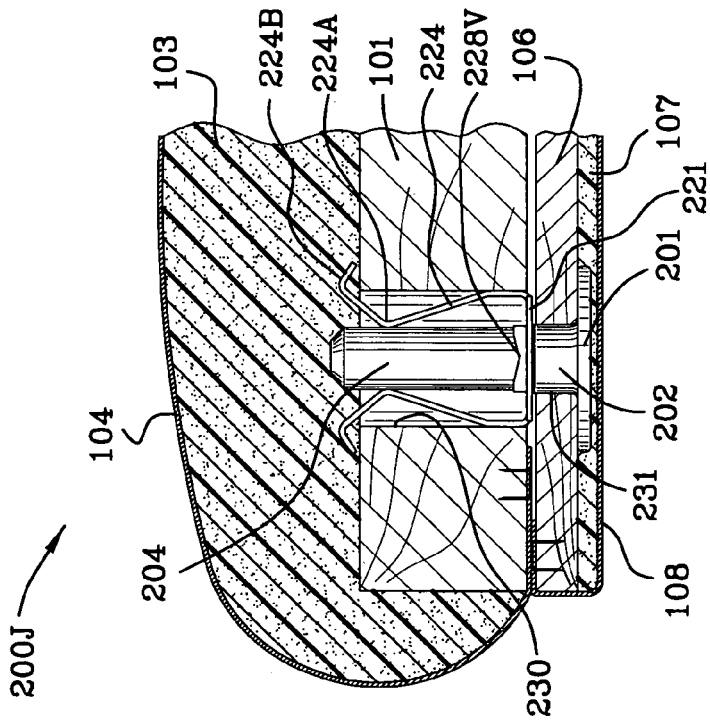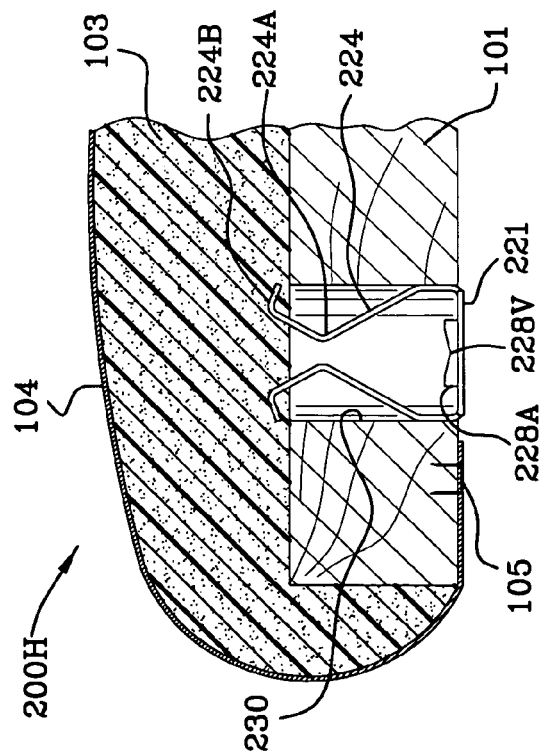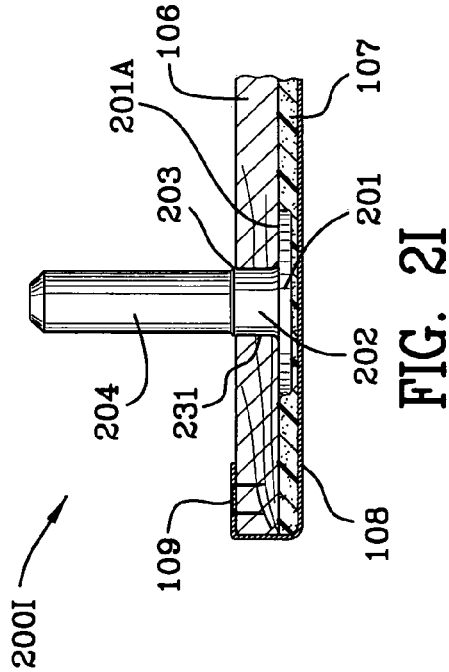

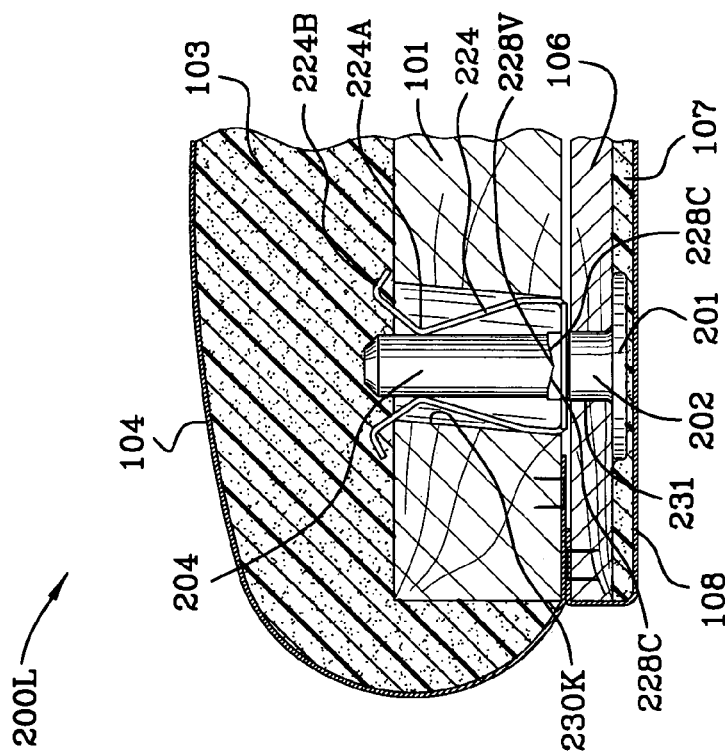
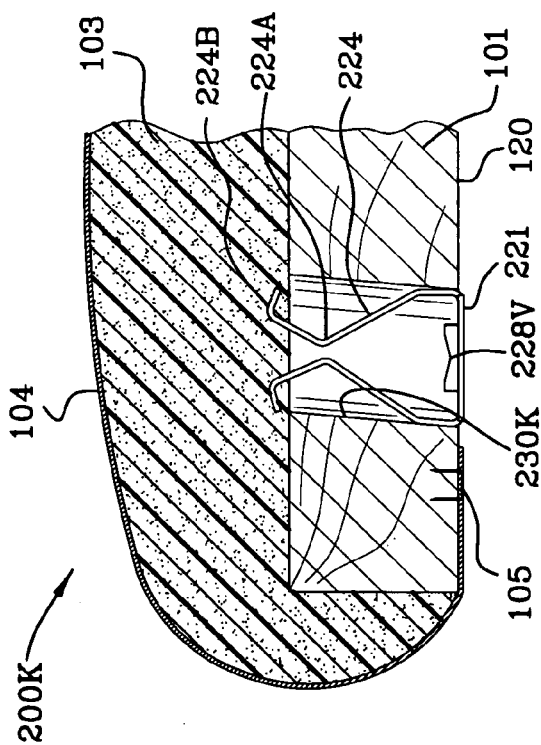
FIG. 2L
FIG. 2K

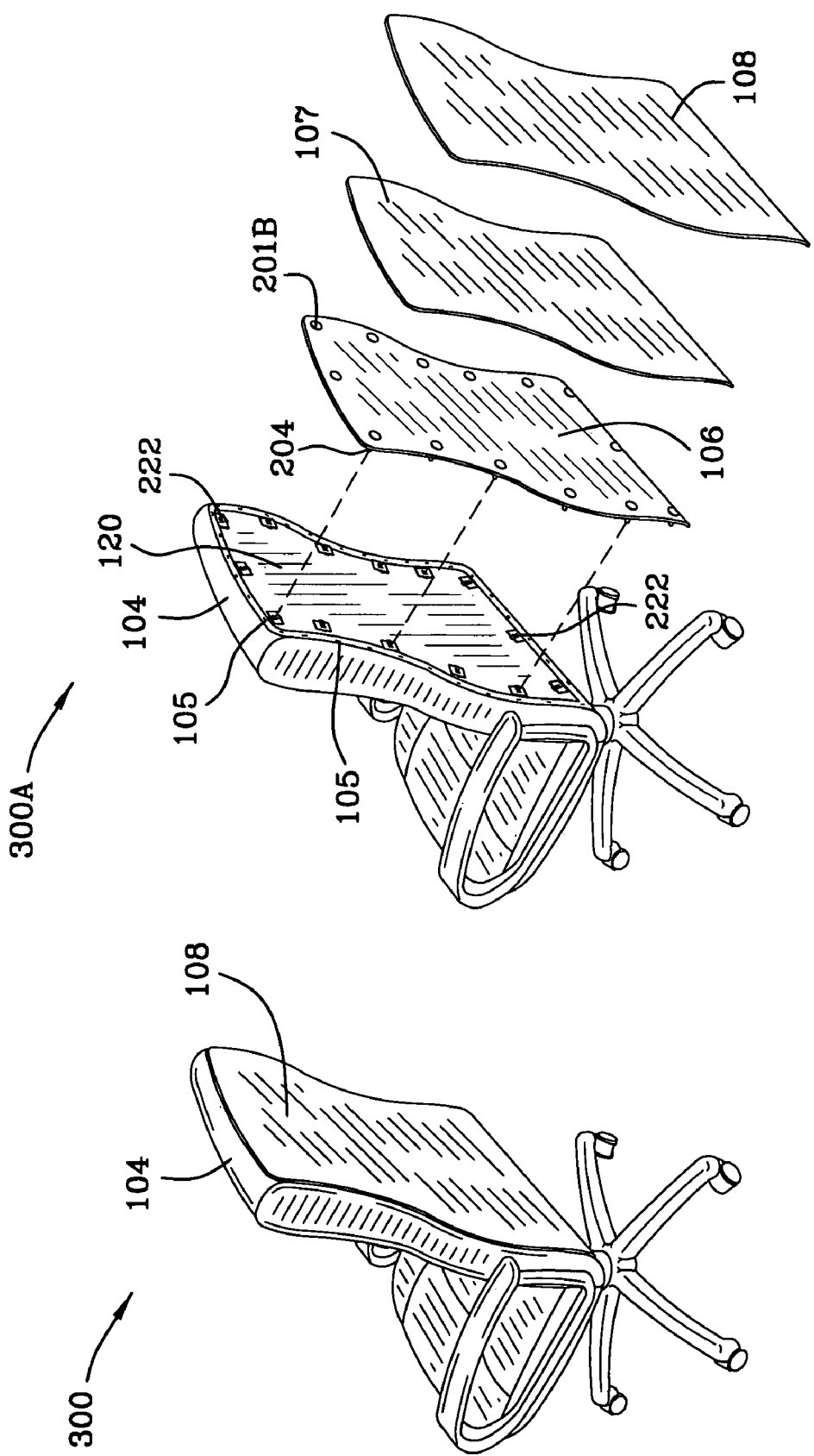

FASTENER AND PROCESS FOR USING SAME

FIELD OF THE INVENTION

The invention is in the field of furniture fasteners.

BACKGROUND OF THE INVENTION

FIG. 1 is a partial cross-sectional view 100 of a prior art outer Christmas tree fastener 110, 111, 111A, 111B inserted into an outer back 106 in proximity with an aperture 102 in an inner back 101. Foam 103 is placed over inner back 101. Typically, inner back 101 is made of wood or it may be plastic in some instances. A covering 104, for example, which may be leather or some other material, is placed over foam 103 and is stapled 105 to the wood substrate 101 as shown. Stapling wraps the covering around the foam and secures the foam in place. Christmas tree fastener 110, 111 is typically made of plastic and includes a shank portion 111, 111A as illustrated in FIG. 1F. Shank portion 111, 111A is illustrated in FIG. 1 as being aligned with aperture or bore 102 in inner back 101. As used herein the terms "bore" and "through-bore" are used interchangeably.

Head 110 of the Christmas tree abuts the exterior surface of outer back 106. Outer back 106 may be masonite, stiff cardboard or thin plywood. The outer back may be 0.125 inches thick by way of example. Other thicknesses and materials may be used for the outer back. Shank 111, 111A is press fit into bore 106A of outer back 106. Bore 106A is formed by drilling as described below. Foam 107 or other padding covers outer back 106 and a leather cover 108 is wrapped over the foam 107 and stapled 109 as illustrated to form a surface which appears to be homogeneous. Shank 111, 111A has a diameter which is larger than the through bore 106A and is thus formed therein and retained by the deformation of the Christmas tree branches 111, 111A.

FIG. 1F is a perspective view 100F of the prior art Christmas tree fastener of FIGS. 1-1E illustrating branches 111, 111A of the Christmas tree alternately and orthogonally arranged with respect to each other. As the branches 111, 111A are inserted into through-bore 102 they are deformed. In fact, branches 111, 111A are deformed as they are inserted into through-bore 106A. Reference numeral 111B is used to denote a knob on the end of the Christmas tree fastener.

FIG. 1A is a cross-sectional view 100A of the prior art outer Christmas tree fastener inserted into an outer back 106 which in turn has been inserted into the inner back 101 joining the inner 101 and outer backs 106 together. Branches 111, 111A of the Christmas tree fastener are bent as they are forced into a smaller diameter through-bore 102 of the inner back 101. A small gap exists between the outer surface 120 of the of the inner back 101 and the inner surface 120A of the outer back 106 caused by the build up of the thicknesses of the covers 104, 108.

FIG. 1B is a cross-sectional view 100B of the prior art Christmas tree fastener in an arrangement similar to that illustrated in FIG. 1 with the outer back 106 and the inner back 101 positioned in proximity to each other and with the inner back 101 having an aperture or through bore 102B which is not coaxial (not aligned) with the aperture or through bore 106A inserted into the outer back 106.

Further, branches 111, 111A of the Christmas tree fastener can be thought of as forming a cylindrically-shaped outer surface which is to be inserted into a cylindrical through-bore 102B. FIG. 1C is a cross-sectional view 100C of the prior art Christmas tree fastener similar to the view of FIG. 1B with the Christmas tree fastener partially inserted in the inner back 101 and broken as indicated by reference numeral 111C. Stress buildup is caused within the plastic Christmas tree fastener as the shank 111, 11A is pushed and shoved into receiving bore 102B which is not aligned with bore 106A of the outer back 106.

The contoured inner and outer backs typically made of wood are used in furniture construction. The contours make drilling of through-bores in the inner and outer backs difficult. During the furniture manufacture and assembly process the contoured inner and outer backs are processed so as to include bores or through bores as they are sometimes referred to herein. The bores are processed in one of three fashions, to wit: (1) the material is put into a press and the holes are punched out in the wood, masonite or cardboard; (2) the inner back may be made out of plastic and the holes are molded during the molding process; and, (3) the plywood inner backs or masonite outer back are drilled in multiple headed drilling equipment. All of these processes produce bores or through bores as they are called which are perpendicular to the work surface of the machine processing the component. This causes holes that are not perpendicular to the point the hole (bore) is produced since the seats have multiple compound curves in them. This induces failure in the prior art Christmas tree Easterners as described herein. As such, alignment of the through bores is not always achieved creating a need for a fastener system which is capable of tolerating alignment faults. When through bores are drilled in the inner backs, they are drilled on a machine surface. The operator of the drill does not always drill the through holes perpendicular to the surface of the wood. Rather, the operator tends to drill through-bores perpendicular to the machine surface and not perpendicular to the surface of a piece of wood.

The wood pieces (back) may be at an angle with respect to the drilling machine surface at the time the through-bore is drilled. If the operator drills through the piece of wood perpendicular to the machine surface then the through-hole is not perpendicular to a line tangent to the surface of the piece of wood being drilled.

In the furniture manufacturing assembly process the misalignment of the through bores in the outer and inner backs is a known problem which creates difficulties in the assembly of the outer back and the inner back together. If the Christmas tree connector of the prior art breaks as illustrated and described herein then the cover (which may be leather) must be removed along with the foam to access the area of the outer back in the vicinity of the broken Christmas tree connector. Staples are then used to join the outer back 106 and the inner back 101 together. If the covering is leather or some other soft material, however, then the staples used to join the outer and the inner backs together tends to tear the leather or any other soft covering which may be used.

FIG. 1D is a plan view 100D of the prior art Christmas tree fastener of FIGS. 1-1C.

FIG. 1E is a shank end view of the prior art Christmas tree fastener of FIGS. 1-1C.

U.S. Pat. No. 5,152,582 to Magnuson entitled Self-Aligning Fastener System Having Stud-Engaging Resilient Legs discloses a fastener having male and female members (fasteners). Stud fasteners 26 have a first end 72 which engage threads of a T-nut 25. Second end 74 of the stud 26 is generally rippled and extends through center apertures 102 of female fastener 46, aperture 38 of seat shell 14, aperture 51 of washer 50 (or retainer) and between resilient legs 76, 78 of female fastener. The fastener system of the '582 patent provides for a female member which may be moved in two axial directions to accommodate insertion of the male member therein.

The structure of the instant invention and the advantages its provides will be readily apparent to a person of ordinary skill in the art when reference is made to the Summary Of The Invention, Brief Description of the Drawings, Description of the Invention and Claims which follow hereinbelow.

SUMMARY OF THE INVENTION

A connector for securing first and second substrates together, comprising: an outer fastener and an inner fastener is disclosed and claimed. The outer fastener comprises a dowel shaped stud. The inner fastener comprises a flange and a pair of clips. Each of the clips includes a first portion and a second portion. The flange is lanced and includes a punched out portion. The stud interengages the flange and the second portion of the pair of clips urges the clips away from each other and away from the stud. The outer fastener is pressed into the first substrate and the second portion of the clips is pressed into the second substrate. The second portion of the clips include a turned back portion and the turned back portion of the clip prevents removal of the inner fastener from the second substrate. The connector is tolerant of the misalignment of the inner and outer fasteners and the bores in which the fasteners reside.

A method for joining the first and second substrates having first and second through bores is disclosed and claimed. The method includes the steps of: inserting and press-fitting a male outer fastener member having a stud portion into the first through bore in the first substrate; inserting and press-fitting a female inner fastener member, the female inner fastener member comprising a flange having a portion which has been lanced and punched out, a pair of clips extending from the flange and each clip of the pair of clips includes a first portion and a second portion; interengaging the stud and the punched out portion of the flange; and, urging the second portion of each of the pair of clips away from each other and away from the stud. The method includes joining the first and second substrates together when the first and second bores are axially misaligned.

It is an object of the instant invention to provide a fastener which includes an inner female member which is tolerant of misalignment with respect to the outer male member.

It is an object of the instant invention to secure two substrates together with each substrate having a bore therein and wherein each of the bores are not aligned with each other.

It is an object of the instant invention to secure two or more substrates together with each substrate having a bore therein.

It is an object of the instant invention to provide a connector which connects under low force and disconnects under high force.

It is an object of the instant invention to provide a connector which easily connects and which is difficult to disconnect.

It is an object of the instant invention to provide a process for securing two substrates together utilizing through-bores in the substrates which are not axially aligned.

It is an object of the instant invention to provide a process for utilizing a female fastener having a lanced, punched out flange and a pair of clips along with a male fastener having a cylindrical stud to secure two substrates having through-bores therein which are not axially aligned.

These and other objects of the invention will be best understood when reference is made to the Brief Description Of The Drawings and Claims which follow hereinbelow.

BRIEF DESCRIPTION OF THE DRAWINGS

FIG. 1 is a partial cross-sectional view of a prior art outer Christmas tree fastener inserted into an outer back in proximity with an aperture in an inner back.

FIG. 1A is a cross-sectional view of the prior art fastener with the outer Christmas tree fastener inserted into an outer back which in turn has been inserted into the inner back joining the inner and outer backs together.

FIG. 2H is a partial cross-sectional view of the inner fastener of the instant invention fitted into the inner back.

FIG. 2I is a partial cross-sectional view of the outer fastener of the instant invention fitted into the outer back.

FIG. 2J is a partial cross-sectional view of the outer and inner fasteners joined together and with the inner and outer backs (substrates) joined together.

FIG. 2K is a partial cross-sectional view similar to the view of FIG. 2H with a bore in the inner back which is not perpendicular to the outer surface of the inner back.

FIG. 2L is a partial cross-sectional view similar to the view of FIG. 2J with the outer and inner fasteners joined together and with the outer and inner backs (substrates) joined together.

FIG. 3 is a perspective view of a chair.

FIG. 3A is an exploded perspective view of the chair of FIG. 3 illustrating inner back, the outer back, the insulation for covering the outer back and the covering of the back.

The drawings will be best understood when reference is made to the Description of the Invention and Claims below.

DESCRIPTION OF THE INVENTION

Figure 1C:
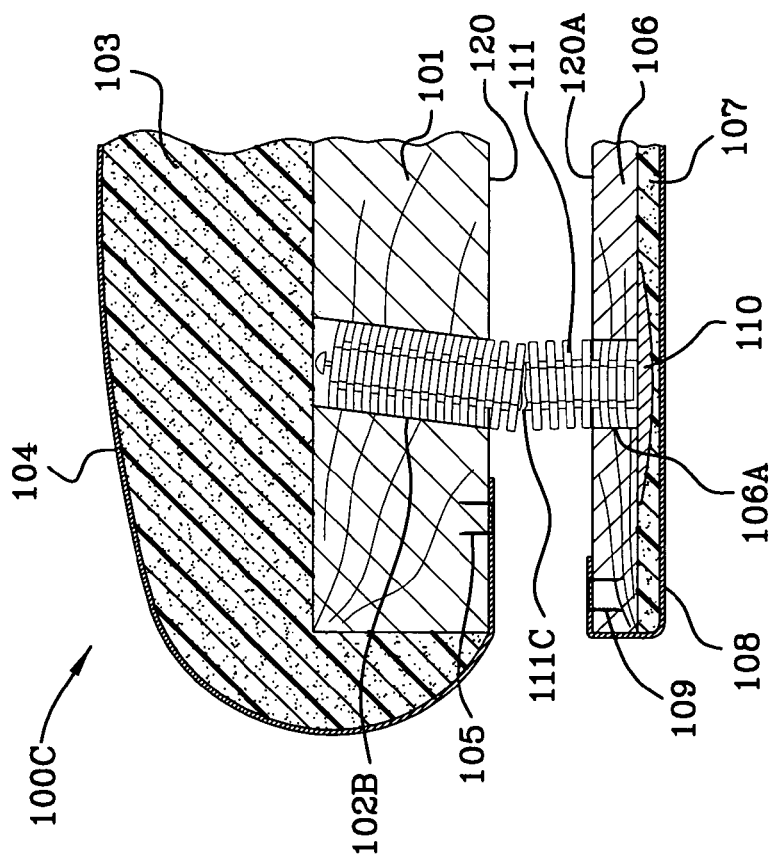
FIG. 1C is a cross-sectional view of the prior art fastener similar to the view of FIG. 1B with the Christmas tree fastener partially inserted in the inner back and broken.
Figure 1B:
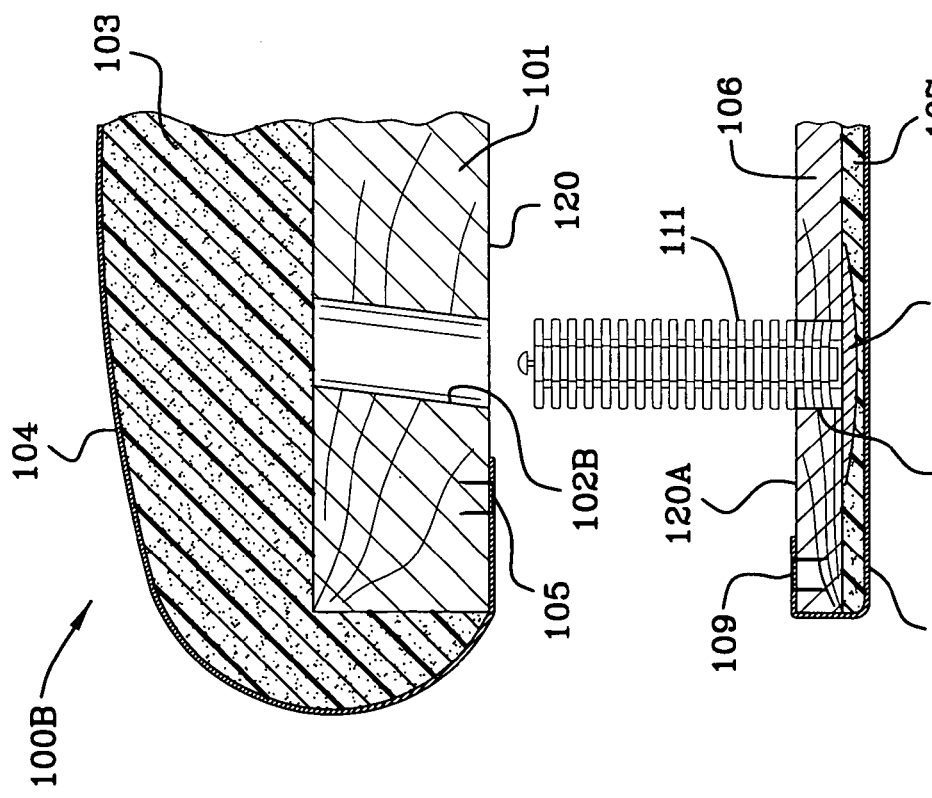
FIG. 1B is a cross-sectional view of the prior art fastener in an arrangement similar to that illustrated in FIG. 1 with the outer back and the inner back positioned in proximity to each other and with the inner back having a through hole (aperture) which is not coaxial (not aligned) with the through hole (aperture) in the outer back.
Figure 1E:
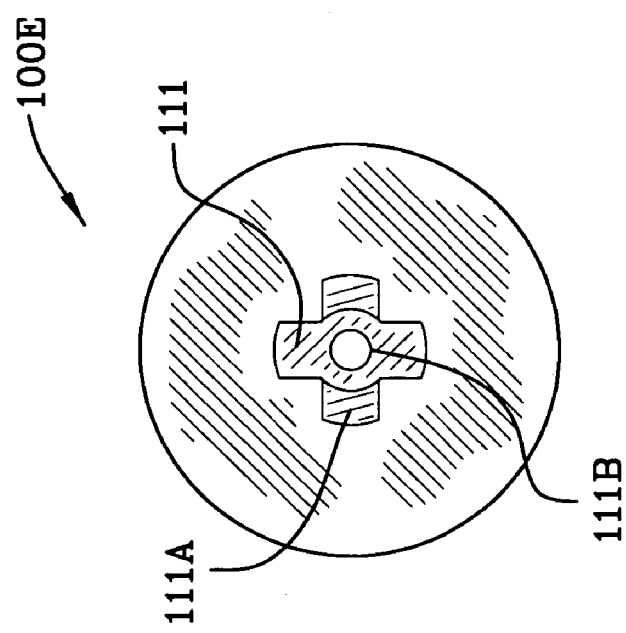
FIG. 1E is an end view of the prior art Christmas tree fastener of FIGS. 1-1C.
Figure 1D:
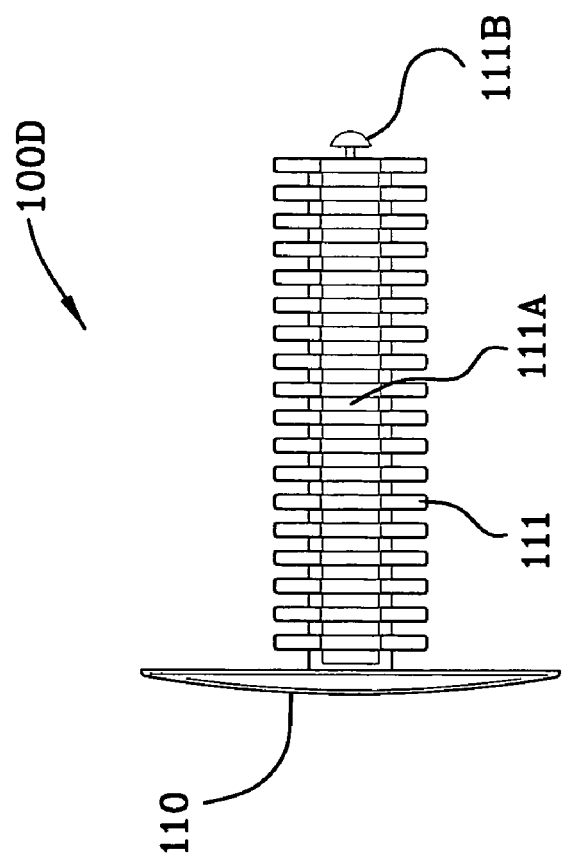
FIG. 1D is a plan view of the prior art Christmas tree fastener of FIGS. 1-1C.
Figure 1F:
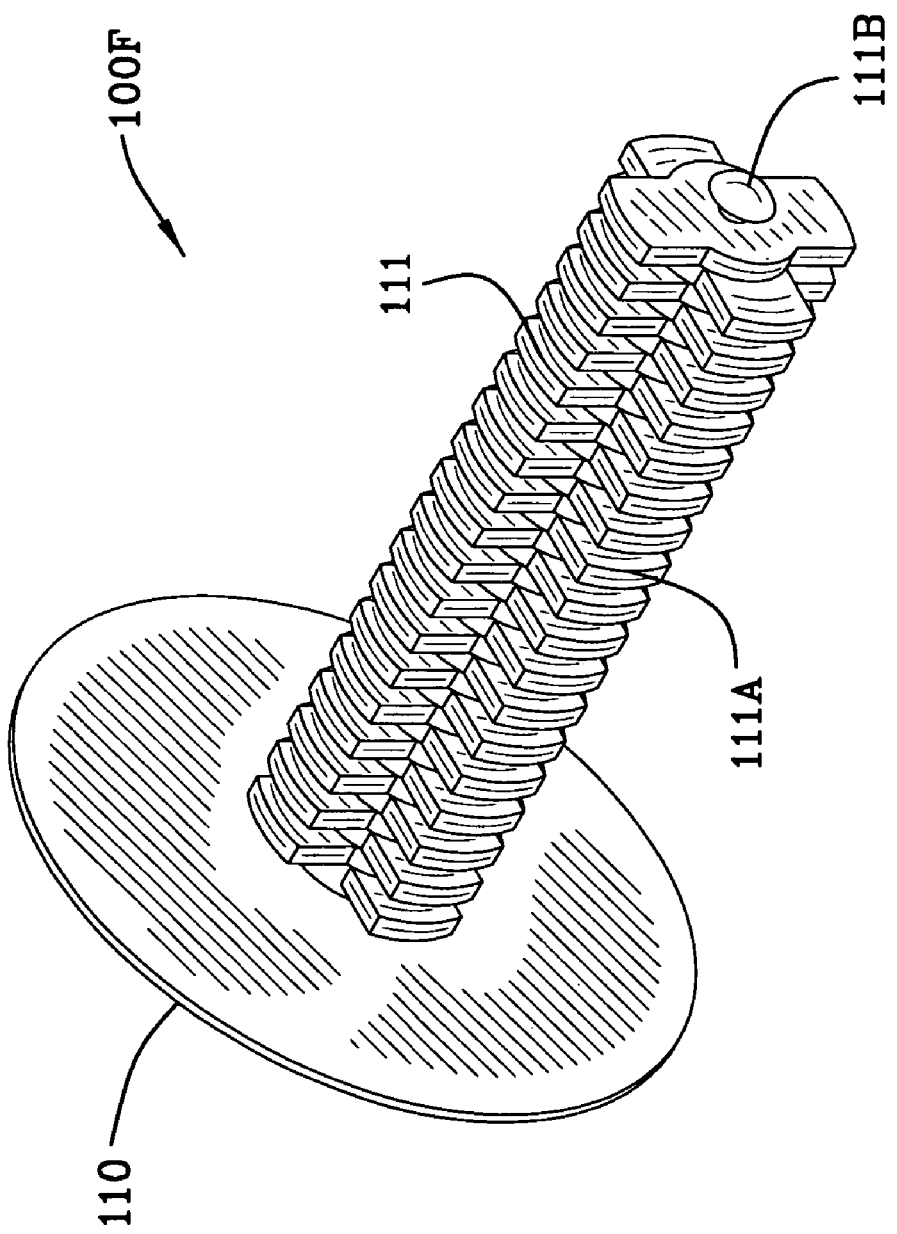
FIG. 1F is a perspective view of the prior art Christmas tree fastener of FIGS. 1-1E.

FIGS. 1-1F have been described above in connection with the Background of the Invention.

As used herein the female portion of the fastener is referred to as the portion which receives the male portion of the fastener. The outer fastener 200 as described herein is the male portion of the fastener (male fastener) and the inner fastener 238 as described herein is the female portion of the fastener (female fastener).

Figure 2A:
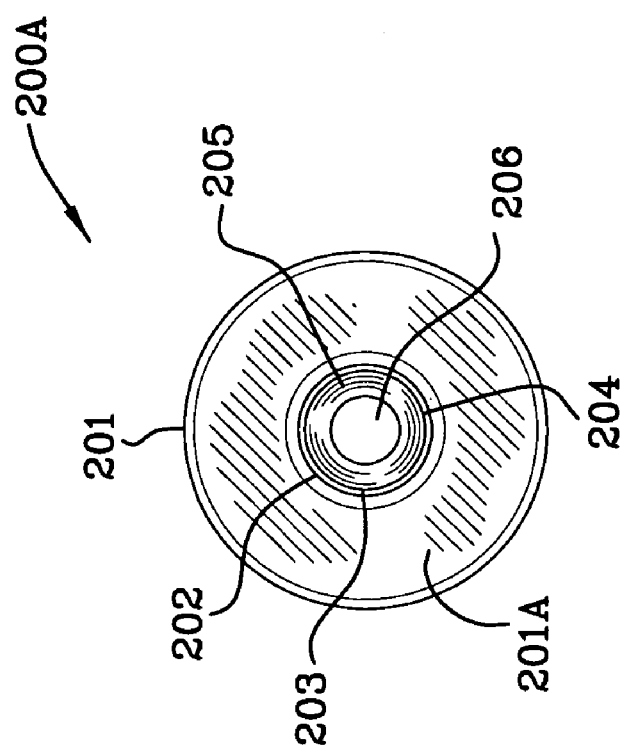
FIG. 2A is an end view of the outer fastener of the instant invention.
Figure 2:
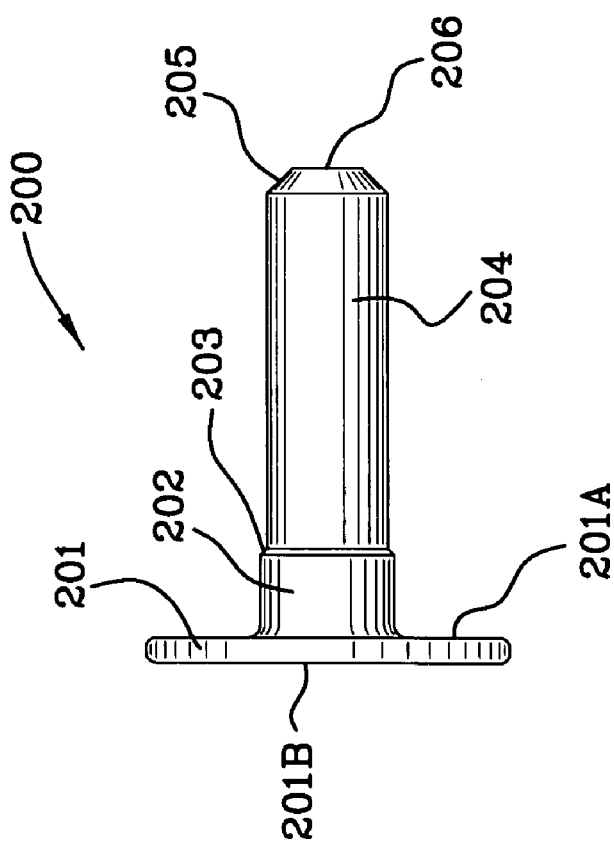
FIG. 2 is a plan view of the outer fastener of the instant invention.

FIG. 2 is a plan view of the outer fastener 200 of the instant invention. FIG. 2A is an end view 200A of the outer fastener 200 of the instant invention. The outer fastener 200 includes flange 201 and reference numeral 201A indicates the inner surface of flange 201 and reference numeral 201B indicates the outer surface of the flange 201. Inner surface 201A of the flange 201 of the male fastener engages the outer back as illustrated in FIG. 2I. A shank extends from the flange and the shank includes a larger diametrical portion 202 and a smaller diametrical portion 204. A tapered portion 205 leads to the end 206 of the shank. The larger diametrical portion 202 of the shank of the outer fastener is press-fit into the first substrate which is sometimes referred to herein as the outer back 106 as illustrated in FIG. 2I. FIG. 2I is a partial cross-sectional view 200I of the outer fastener 200 of the instant invention fitted into the outer back 106. Reference numeral 231 indicates the bore in the outer back 106. The outer fastener 200 is zinc plated carbon steel and is shown in a plan view (i.e. not in cross-section) in FIG. 2I. The diameter 202 of the shank is slightly larger than the diameter of the bore 231.

Figure 2E:
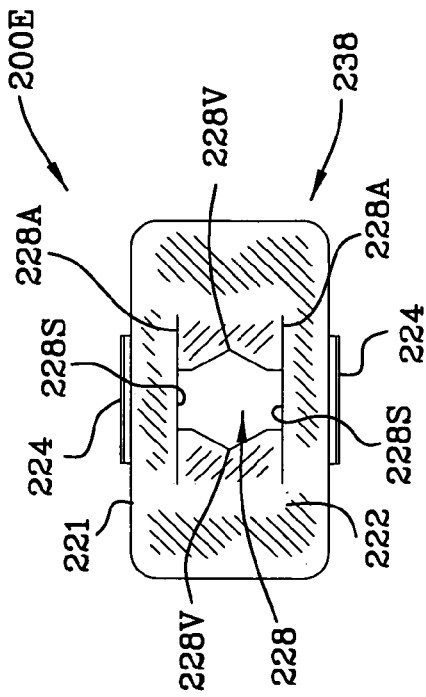
FIG. 2E is a flange-end view of the inner fastener of the instant invention.
Figure 2B:
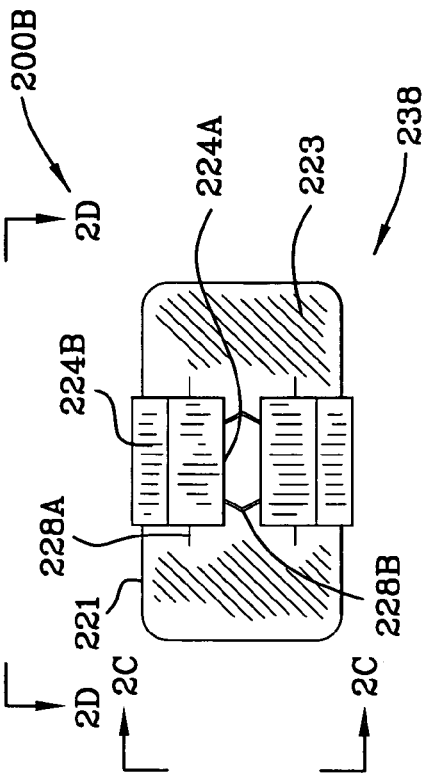
FIG. 2B is a clip-end view of the inner fastener of the instant invention.
Figure 2D:
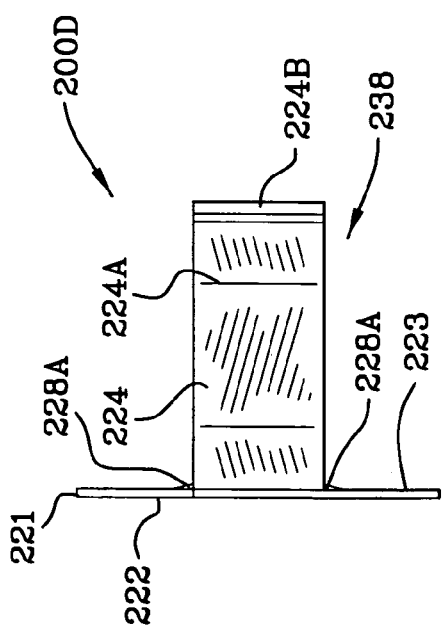
FIG. 2D is left side plan view of the inner fastener of the instant invention.

FIG. 2B is a clip-end view 200B of the inner fastener 238 of the instant invention. FIG. 2B illustrates the flange 221 which is generally rectangularly shaped with rounded corners. Inner grip portion 224B is turned back so as to grip the inner substrate or inner back as described in more detail later herein. Neck portion 224 of the clips is illustrated and it is this neck portion which interengages stud 204 as illustrated in FIGS. 2F and G. Inner surface 223 of flange 221 interengages surface 120 of inner back 101. See FIG. 3. Inner back 101 is typically 0.5 inches thick and usually is made of plywood or particle board. However, plywood and other synthetic materials may be used. Reference numeral 228 indicates a punched out portion of flange 221 to create an aperture in the wall of the flange 221 which receives stud or shank 204 of the male fastener 200. Reference numeral 228A indicates a lanced (or cut) portion of the wall of the flange.

Figure 2C:
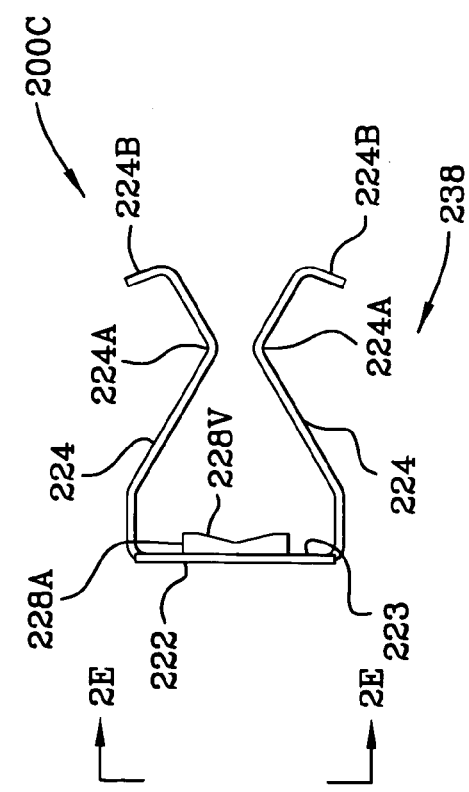
FIG. 2C is a left side view of the inner fastener of the instant invention.
Figure 2F:
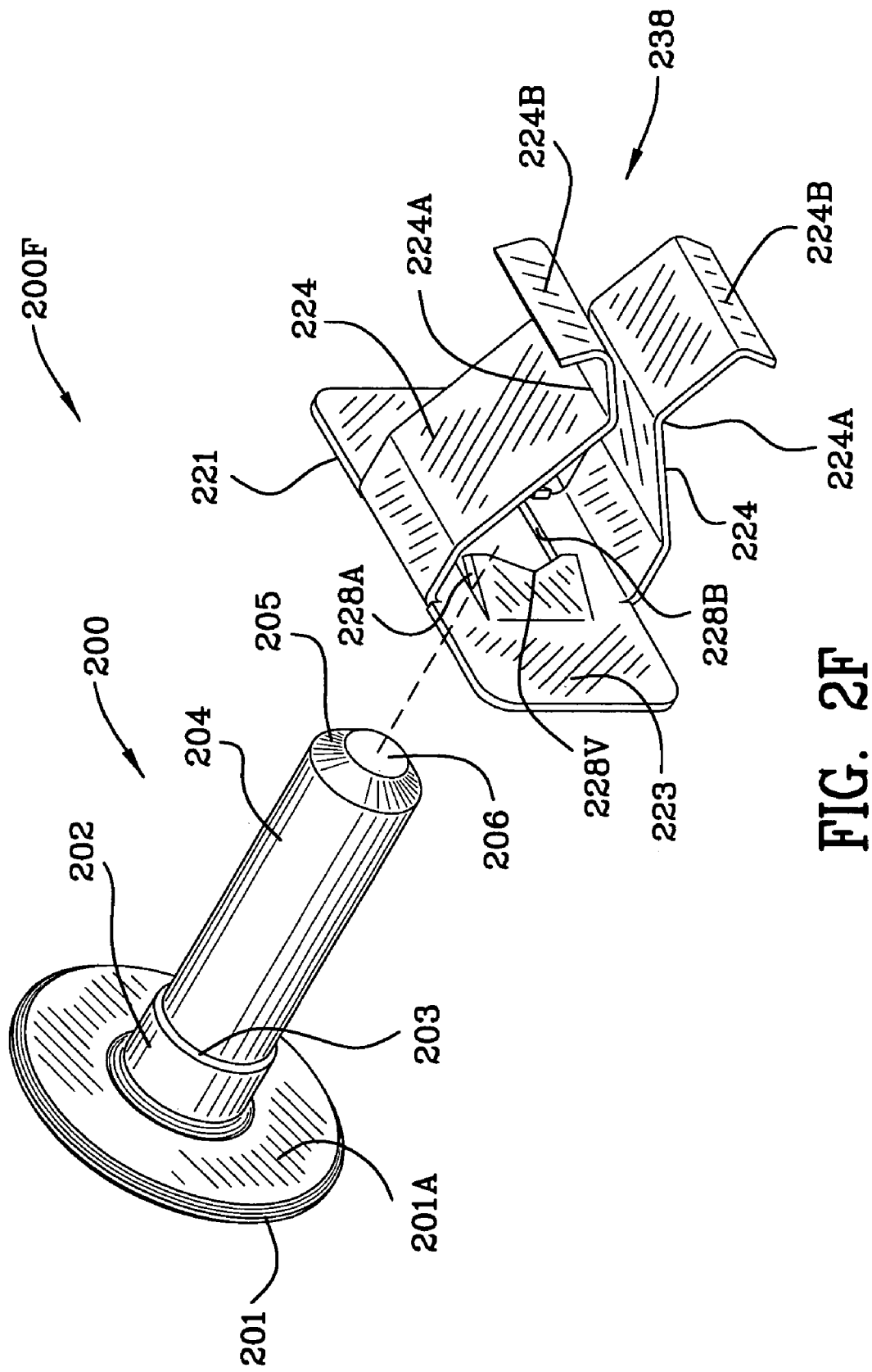
FIG. 2F is a perspective view of the fastener of the instant invention illustrating both the inner and outer fasteners of the instant invention spaced apart.

FIG. 2C is a left side view 200C of the inner fastener 238 of the instant invention taken along the lines 2C-2C of FIG. 2B. Outer surface 222 of flange 221 is illustrated in this view. Clips 224 are shown along with neck portions 224A and turned back portions 224B. Punched out portion 228 of flange 221 can be viewed well in FIG. 2C. Preferably, the material of the inner fastener is zinc plated carbon steel which has been baked to neutralize embrittlement. Different thicknesses of the metal can be used. One such thickness by example only which may be used is 0.017 inches.

FIG. 2D is a left side plan view 200D of the inner fastener 238 of the instant invention taken along the lines 2D-2D of FIG. 2B. FIG. 2E is a flange-end view 200E of the inner fastener of the instant invention taken along the lines 2E-2E of FIG. 2C. FIG. 2E illustrates the punched out portion 228 of flange 221 as including two V-shaped notches 228 and two straight portions 228S. The V-shaped notches 228V each engage the shank 204 in at least two places when fully inserted in the flange/female fastener 238. Therefore, there are at least four points of contact between shank/stud 204 and the V-shaped notches. Reference numeral 228B as used in FIG. 2B and 2D illustrates the wall thickness of the flange where it has been deformed by lancing/punching it so as to form the punched out portion 228.

Figure 2G:
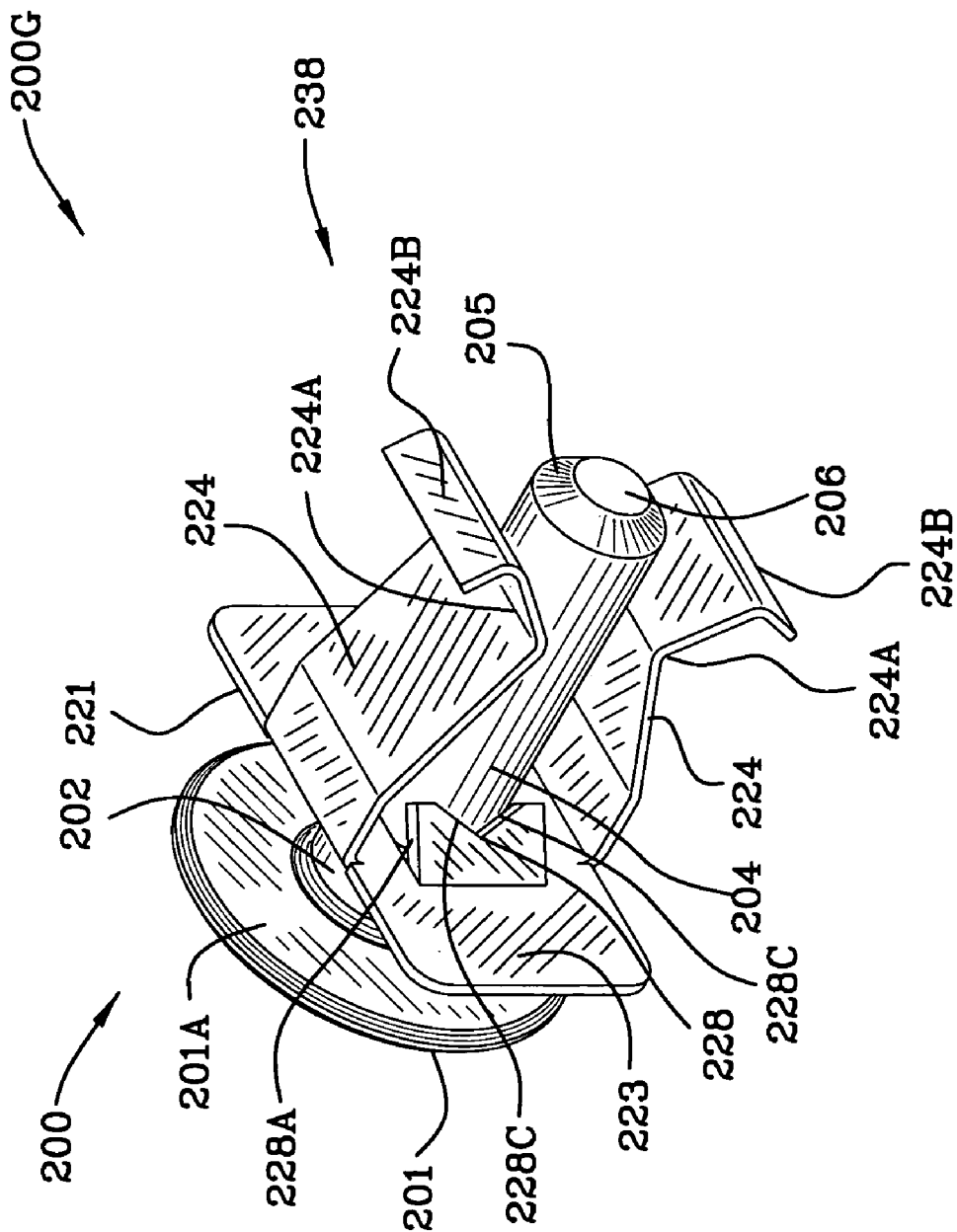
FIG. 2G is a perspective view of the fastener of the instant invention illustrating both the inner and outer fasteners joined together.

FIG. 2F is a perspective view 200F of the fastener of the instant invention illustrating both the inner 238 and outer 200 fasteners of the instant invention spaced apart. FIG. 2G is a perspective view 200G of the fastener of the instant invention illustrating both the inner 238 and outer 200 fasteners joined together. Neither FIGS. 2G nor 2F illustrate the first (outer) and second (inner) substrates.

FIG. 2H is a partial cross-sectional view 200H of the inner fastener 238 of the instant invention press fitted into the inner back 101. Reference numeral 230 identifies a through bore in a 0.5 inch thick inner back. Inner fastener 238 is shown in a plan view (i.e. an elevational view not in cross section) and is press fitted with relatively slight pressure into through bore 230. Clips 224 engage the cylindrical walls of bore 230 and secure the female fastener 238 within the bore 230. FIG. 2I is a partial cross-sectional view 200I of the outer fastener 200 of the instant invention fitted into the outer back 106 and shown aligned with the through bore 230 illustrated in FIG. 2H. Outer fastener 200 is shown in a plan view in FIG. 2I. Referring to FIG. 2I, shank 202 is press fit into bore 231 in the outer back 106.

FIG. 2J is a partial cross-sectional view 200J of the outer and inner fasteners joined together thus affixing inner 101 and outer 106 backs together. Fasteners 200, 238 are shown in a plan view in FIG. 2J. Stud 204 spreads the neck 224A of clip 224 so that turned back portions 224B extend radially outwardly past cylindrical base 230 and over inner back 101 such that turned end portions 224B would engage inner back 101 if the inner fastener (female fastener) 238 were to be extracted from the bore 230. Referring to FIGS. 2H, 2I and 2J reference numerals used in connection with describing the foam and the coverings for the furniture are the same as described above in connection with the prior art FIGS. 1-1F.

It will be noticed when referring to FIGS. 2G and 2J that the punched out portion 228 of the flange is illustrated as gripping the stud 204. As stud or shank is inserted under pressure into the female fastener 238 the walls 228C of the punched out portion are deformed and separated as illustrated in FIG. 2G. The V-shaped notch of the punched out portion is sized so as to frictionally grip the exterior of the stud 204. Referring to FIGS. 2B and 2E two V-shaped notches are viewed for gripping stud 204 when inserted in the punched out portion 228. It will be noticed that at least four (4) contact points are created when stud 204 is inserted in the punched out portion 228. Referring to FIGS. 2F and 2G it will be noticed that the angle of inclination of the V-shaped punched out portion is larger in FIG. 2G as compared to FIG. 2F.

FIG. 2K is a partial cross-sectional view 200K similar to the view of FIG. 2H with a bore 230K in the inner back 101 which is not perpendicular to the outer surface 120 of the inner back 101. FIG. 2K illustrates the fasteners 200, 238 in a plan view, not in cross-section. FIG. 2K also illustrates the outer fastener press fit into the outer back 106 in proximity to inner fastener 238 which has been press fitted within bore 230K. Bore 230K in inner back 101 is not in alignment with bore 231 in outer back 106. This misalignment is caused by drilling the inner back 101 separately from drilling outer back 106. In other words, substrates 101 and 106 are not clamped together when drilled. Additionally the inner and outer backs have contours and they are often drilled on a flat machine surface. As such, the bores or through-bores are not axially aligned and are at an acute angle when assembled.

FIG. 2L is a partial cross-sectional view 200L similar to the view of FIG. 2J with the outer and inner fasteners 200, 238 joined together and with the outer back (first substrate) 106 and inner back (second substrate) 101 joined together. FIG. 2L illustrates the fasteners 200, 238 in a plan view. The fastener of the instant invention is fault tolerant in that the bores 231, 230K of the outer back 106 and the inner back 101 do not have to be aligned with respect to each other to successfully join the connector (fastener) of the instant invention together thus joining the first and second substrates together. This represents a distinct manufacturing advantage in the assembly of the furniture as compared to the disassembly of the covering and cushion over the back of the outer back of the chair to staple the outer and inner backs together upon the fracture (breakage) of the prior art Christmas tree fastener.

Referring to FIGS. 2G, 2J and 2L the fastener of the instant invention does not permit disconnection of the male fastener 200 from the female fastener 238 unless an abnormally high separation force is applied. The separation force of the instant invention is more than three times the separation force of the prior art Christmas tree fastener. Referring to FIG. 2G, reference numeral 228C illustrates the frictional engagement of the punched out portion 228 of the flange 221 and the shank 204 of the male fastener 201. Separation of fasteners 200, 238 requires that the V-shaped notches in the punched-out portion 228 of the flange must be deformed by folding back on themselves.

Figure 2M:
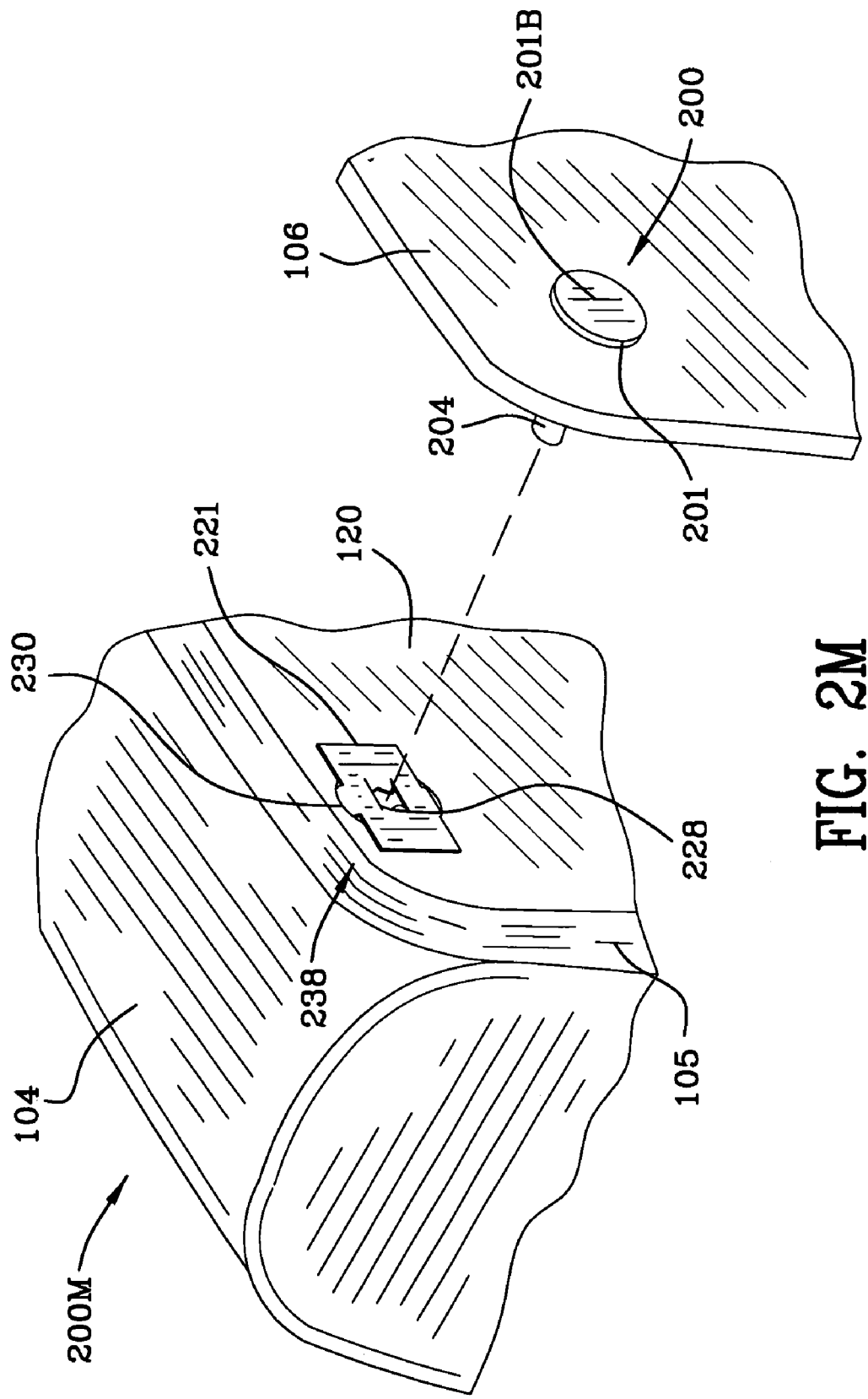
FIG. 2M is a cross-sectional view of the outer fastener mounted in the outer back and the inner fastener mounted in the inner back.

FIG. 2M is a cross-sectional view 200M of the outer fastener 200 mounted in the outer back 106 and the inner fastener 238 mounted in the inner back.

Figure 2N:
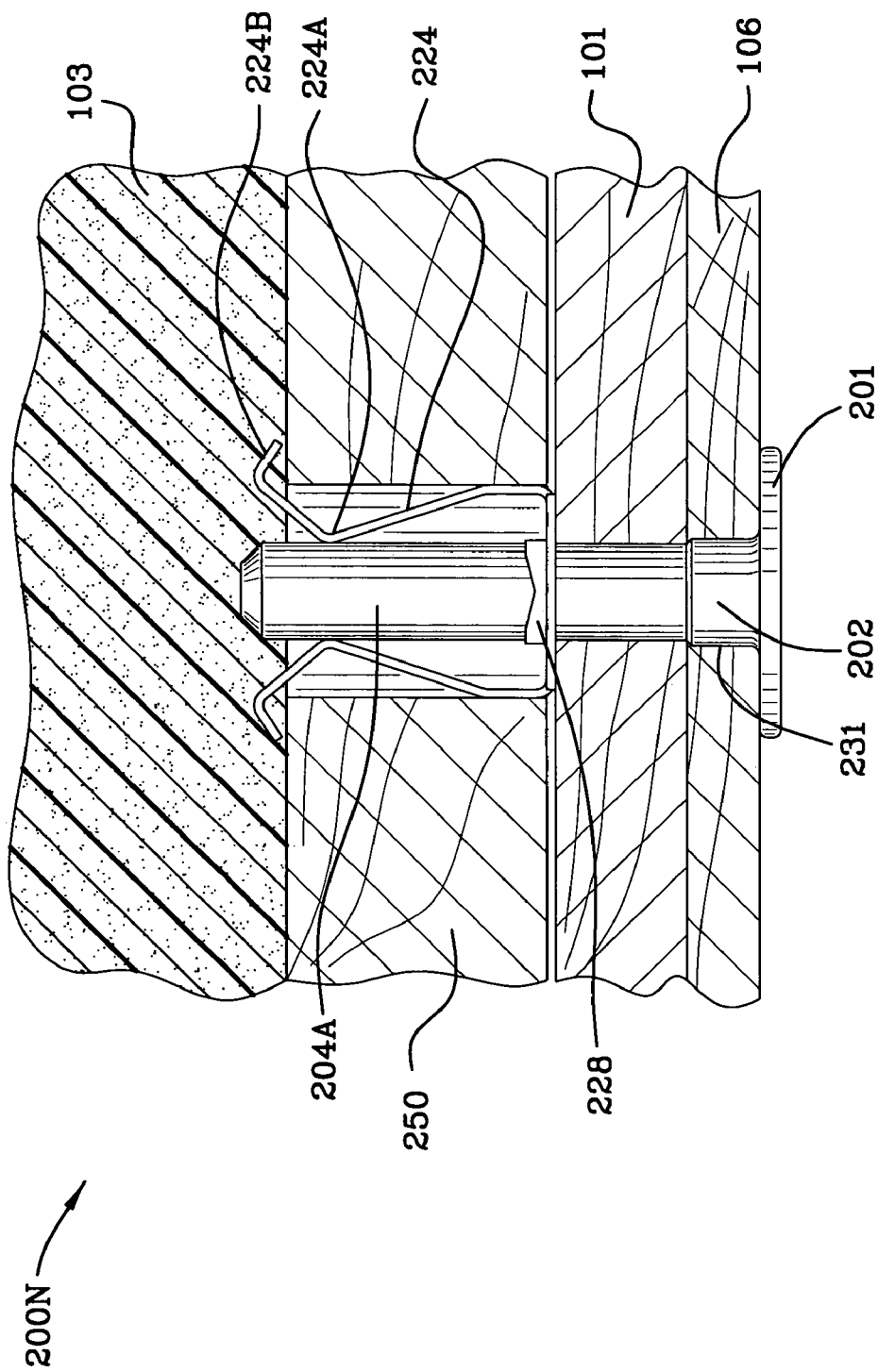
FIG. 2N is cross-sectional view of another embodiment of the invention which employs a stud whose length is longer than the stud of FIG. 2G.

FIG. 2N is a partial cross-sectional view 200N of another embodiment of the invention which employs a stud 204A whose length is longer than the stud 204 previously described and shown herein. Use of a stud having an extended length enables joinder of a third substrate 250 as illustrated. FIG. 2N illustrates fasteners 200, 238 in a plan view.

FIG. 3 is a perspective view 300 of a chair. FIG. 3A is an exploded view 300A of the chair of FIG. 3 illustrating the outer surface 120 of the inner back 101, the outer back 106, the insulation 107 which covers the outer back 106 and the covering 108 of the outer back. The instant invention allows for easy assembly and connection of the outer back to the inner back without the need for uncovering the insulation 107 and the cover 108 to staple the outer back 106 to the inner back 101.

A method for joining the first and second substrates having first and second through bores includes the steps of: inserting and press-fitting a male outer fastener member having a stud portion into the first through bore in the first substrate; inserting and press-fitting a female inner fastener member, the female inner fastener member comprising a flange having a portion which has been lanced and punched out, a pair of clips extending from the flange and each clip of the pair of clips includes a first portion and a second portion; interengaging the stud and the punched out portion of the flange; and, urging the second portion of each of the pair of clips away from each other and away from the stud. The method includes joining the first and second substrates together when the first and second bores are axially misaligned.

LIST OF REFERENCE NUMERALS 100 cross-section of the prior art Christmas tree fastener of FIG. 1
100A cross section of the prior art Christmas tree fastener of FIG. 1A
100B cross section of the prior art Christmas tree fastener of FIG. 1B
100C cross section of the prior art Christmas tree fastener of FIG. 1C
100D plan view of the prior art Christmas tree fastener
100E end view of the prior art Christmas tree fastener
100F perspective view of the prior art Christmas tree fastener
101 inner back (wood or plywood) substrate
102 bore or aperture in the inner back
102B non-perpendicular bore in the inner back
103 cushion/elastomeric cushion
104 cover over cushion
105 staple affixing the cover to the cushion
106 outer back (wood or plywood) substrate
106A interference fit of the Christmas tree in a bore in the outer back
107 cushion or elastomeric cushion
108 cover over the cushion
109 staple affixing cover to outer back (wood or plywood) substrate
110 head of christmas tree
111 branch of Christmas tree body
111A branch of Christmas tree body
111B end of the Christmas tree body
111C break point of the Christmas tree fastener
120 outer surface of inner back 101
200 plan view of the outer fastener (male fastener)
200A end view of the outer fastener
200B clip-end view of the inner fastener
200C left side view of the inner fastener
200D top view of the inner fastener
200E flange-end view of the inner fastener
200F perspective view of the inner and outer fasteners
200G perspective view of the inner and outer fasteners coupled together
200H cross-sectional view of the inner fastener in the through-bore of the inner back
200I cross-sectional view of the outer fastener in the through-bore of the outer back
200J cross-sectional view of the inner and outer fasteners coupled together
200K cross-sectional view of the inner fastener in the inner back in proximity to the outer fastener in the outer back
200L cross-sectional view of the inner and outer fasteners joined together
201 flange of the outer fastener
201A inner surface of the flange
201B outer surface of the flange
202 larger diametrical portion of the shank of the outer fastener
203 shoulder
204 smaller diametrical portion of the shank
205 tapered end of the shank
206 end of the shank
221 flange of the inner fastener
222 outer surface of flange of inner fastener
223 inner surface of flange of outer fastener
224 clip of inner fastener 224A neck of clip of inner fastener
224B inner grip portion of clip of inner fastener
228 punched out portion
228A lanced portion of the flange
228B wall of punched out portion
228C frictional interference
228S straight portion of punched out portions
228V V-shaped portion of punched out portions
230 through-bore in inner back
231 through-bore in outer back
230K non-perpendicular through-bore in inner back
238 Inner fastener (female fastener)
250 second inner back
300 perspective view of a chair
300A exploded perspective view of the chair Those skilled in the art will realize that the invention has been set forth with particularity by way of example only and that many changes may be made to the invention without departing from the spirit and scope of the appended claims.

The invention claimed is:

1. A connector securing first and second substrates together, comprising:
   said first and second substrates include axially misaligned first and second bores therein, respectively, said first bore in said first substrate being oriented at a first angle with respect to the surface of said first substrate, said second bore in said second substrate being oriented at a second angle with respect to the surface of said second substrate, and, said surfaces of said first and second substrates being parallel;
   said first and second angles being different angles with respect to each other;
   an outer fastener and an inner fastener;
   said outer fastener comprising a dowel shaped stud, said dowel shaped stud includes a first larger diameter and a second diameter, said first larger diameter of said stud is press fit into said first bore of said first substrate;
   said inner fastener comprising a flange and a pair of clips, said pair of clips includes a first portion and a second portion, said flange is lanced and includes a punched out portion, said first portion of said pair of clips is press fit in said second bore of said substrate;
   said second portion of said clips includes a neck portion and a turned back portion, said turned back portion of said clips having a width less than the diameter of said second bore of said second substrate before said second diametrical portion of said stud interengages said neck portion of said clips and while said inner fastener is being inserted into said second bore, said turned back portion of said clips prevent removal of said inner fastener from said second substrate when said stud interengages said neck portion of said clips and spreads said clips apart;
   said stud interengages said neck portion of said pair of clips forcing said neck portion of said clips apart extending to a width which exceeds said diameter of said second bore;
   said dowel-shaped stud interengages said punched out portion of said flange and deforms said punched out portion, and, said dowel-shaped stud frictionally engages said punched out portion of said flange preventing the withdrawal of said dowel-shaped stud from said flange and said clips preventing extraction of said inner fastener from said second bore thus securing said first and second substrates together.

2. A connector securing first and second substrates together as claimed in claim 1 wherein said first substrate is selected from the group consisting of cardboard and masonite and said second substrate is selected from the group consisting of plywood and particle board.

3. A fastener system securing first and second substrates together, comprising:
   said first and second substrates include axially misaligned first and second bores therein, respectively, said first bore in said first substrate being oriented at a first angle with respect to the surface of said first substrate, said second bore in said second substrate being oriented at a second angle with respect to the surface of said second substrate, and, said surfaces of said first and second substrates being parallel;
   said first and second angles being different angles with respect to each other;
   a male outer fastener member and a female inner fastener member;
   said male outer fastener member comprising a stud having first and second diameters, said male outer fastener includes a head affixed to said stud and said stud is press-fit within said first bore of said first substrate;
   said second substrate includes a second bore therein and wherein said female inner fastener member is partially inserted in said second bore;
   said female inner fastener member comprising a flange and a pair of clips extending from said flange, each clip of said pair of clips includes a first portion and a second portion, said first portion of said clips being press fit into said second bore of said second substrate, said second portion of said clips includes a turned back portion having a width less than the diameter of said second bore in said second substrate, said turned back portion of said clips prevent removal of said inner fastener from said second substrate when said second diameter of said stud spreads said clips apart;
   said flange is lanced and includes a punched out portion;
   said first portion of said female inner fastener member is press-fit within said second bore of said second substrate; and,
   said stud interengaging said flange and said second portion of each of said pair of clips urging each of said clips away from each other and away from said stud securing said first and second substrates together.

4. A fastener system securing first and second substrates together as claimed in claim 3 wherein said first substrate is selected from the group consisting of cardboard and masonite and said second substrate is selected from the group consisting of plywood and particle board.

5. A method joining first and second substrates together, said first and second substrates include axially misaligned first and second through bores therein, respectively, said first bore in said first substrate being oriented at a first angle with respect to the surface of said first substrate, said second bore in said second substrate being oriented at a second angle with respect to the surface of said second substrate, and, said surfaces of said first and second substrates being parallel, said first and second angles being different angles with respect to each other, comprising the steps of:
   inserting and press-fitting a male outer fastener member having a stud portion into said first through bore in said first substrate;
   inserting and press-fitting a female inner fastener member into said second bore of said second substrate, said female inner fastener member comprising a flange having a portion which has been lanced and punched out, a pair of clips extending from said flange, each said clip of said pair of clips includes a first portion and a second portion;

interengaging said stud and said flange;

urging said second portion of each of said clips away from each other and away from said stud;

forcing said first substrate into engagement with said flange of said female inner fastener and said second substrate; and, securing said substrates together.

6. A method joining first and second substrates as claimed in claim 5 wherein said first substrate is selected from the group consisting of cardboard and masonite and said second substrate is selected from the group consisting of plywood and particle board.

7. A connector securing first and second substrates together, comprising:

said first and second substrates include first and second bores therein;

said first bore having a first axis, said second bore having a second axis, said first axis and said second axis being at an acute angle with respect to one another;

an outer fastener and an inner fastener;

said outer fastener comprising a dowel shaped stud, said dowel shaped stud includes a first larger diameter and a second diameter, said first larger diameter of said stud is press fit into said first bore of said first substrate;

said inner fastener comprising a flange and a pair of clips, said pair of clips includes a first portion and a second portion, said flange is lanced and includes a punched out portion, said first portion of said pair of clips is press fit in said second bore of said substrate;

said second portion of said clips includes a neck portion and a turned back portion, said turned back portion of said clips having a width less than the diameter of said second bore of said second substrate before insertion into said bore and before said second diametrical portion of said stud interengages said neck portion of said clips, said turned back portion of said clips prevent removal of said inner fastener from said second substrate when said stud interengages said neck portion of said clips and spreads said clips apart;

said stud interengages said neck portion of said pair of clips forcing said neck portion of said clips apart extending to a width which exceeds said diameter of said second bore;

said dowel-shaped stud interengages said punched out portion of said flange and deforms said punched out portion, and, said dowel-shaped stud frictionally engages said punched out portion of said flange preventing the withdrawal of said dowel-shaped stud from said flange and said clips preventing the extraction of said inner fastener from said second bore thus securing said first and second substrates together.

* * * * *

UNITED STATES PATENT AND TRADEMARK OFFICE
CERTIFICATE OF CORRECTION

| | | |
|---|---|---|
| PATENT NO. | : 7,524,129 B2 | Page 1 of 1 |
| APPLICATION NO. | : 11/444729 | |
| DATED | : April 28, 2009 | |
| INVENTOR(S) | : Stephen Selle | |

It is certified that error appears in the above-identified patent and that said Letters Patent is hereby corrected as shown below:

Col. 2, line 4, delete "11A" and insert -- 111A --.

Col. 2, line 25, delete "Easterners" and insert -- fasteners --.

Signed and Sealed this

Second Day of June, 2009

JOHN DOLL
*Acting Director of the United States Patent and Trademark Office*